Nov. 21, 1967  E. L. FARRAR  3,353,634
EMERGENCY BRAKE SYSTEM FOR AUTOMOBILES
Filed Oct. 22, 1965  2 Sheets-Sheet 1
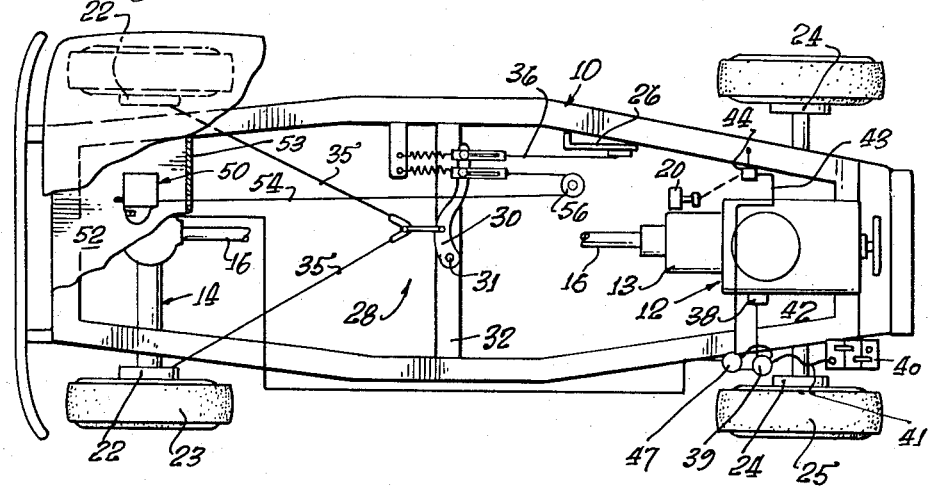
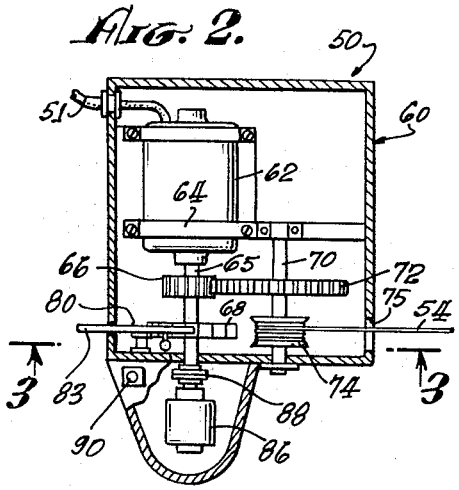
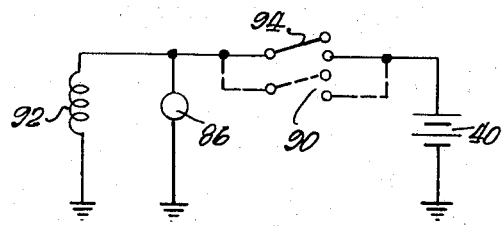
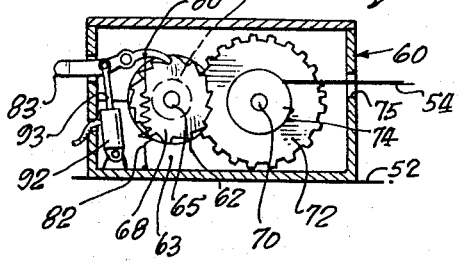
INVENTOR.
Emanuel L. Farrar,
By Bartlett + Lewis

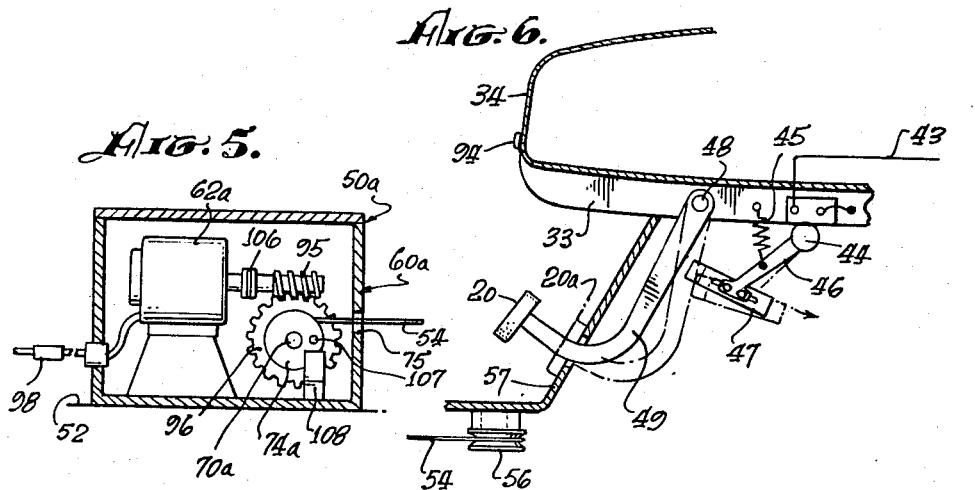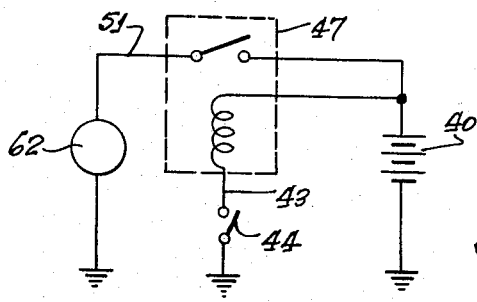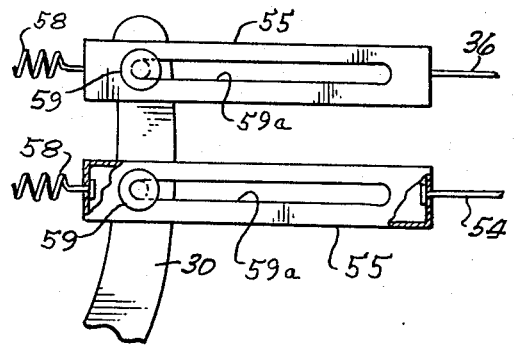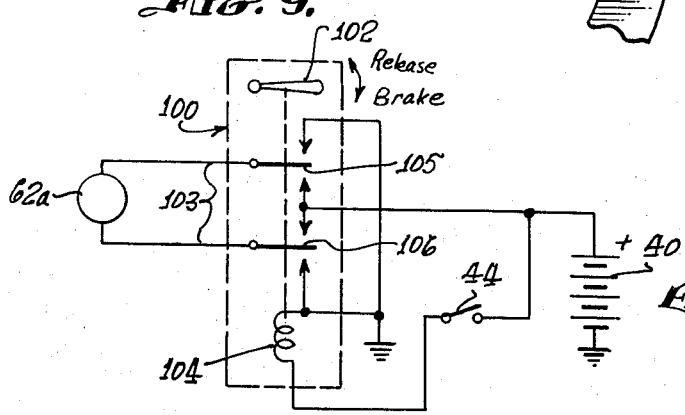

United States Patent Office 3,353,634
Patented Nov. 21, 1967

3,353,634
EMERGENCY BRAKE SYSTEM
FOR AUTOMOBILES
Emanuel L. Farrar, 149 E. 117th St.,
Los Angeles, Calif. 90061
Filed Oct. 22, 1965, Ser. No. 501,903
1 Claim. (Cl. 188—106)

ABSTRACT OF THE DISCLOSURE

A safety brake system applies the brakes of an automobile automatically in response to abnormally great depression of the regular brake pedal. A switch energizes an electric motor, coupled to the brakes, with ratchet or other means for maintaining brake application until manually released. Preferred structures for installation and control of the system are described.

---

This invention has to do generally with automobile safety, and relates more particularly to mechanism for stopping an automobile safely and reliably in case of failure of the regular brake control system.

The conventional hydraulic brake control system of an automobile is subject to occasional failure, due to such causes as breaking of a hydraulic line from metal fatigue, damage by flying rocks or similar causes. The resulting loss of hydraulic fluid typically permits the brake pedal to be depressed all the way to the floor without applying the brakes. The average driver when suddenly confronted by such brake failure is often unable to make proper use of the parking brake control, either because its manipulation is unfamiliar or because it is entirely ineffective to control the automobile promptly and effectively. The danger from brake failure is especially great in cars having automatic transmissions, since it is then often difficult or impossible for the operator to shift to a gear in which the engine produces effective braking action.

An important object of the present invention is to eliminate the danger of serious accident due to failure of the normal brake control system by providing a simple and reliable auxiliary control system that automatically applies the brakes in case of such failure.

A particular feature of the invention is that the auxiliary brake control system produces brake application when required without any special action by the operator. Hence it is unnecessary for the operator to remember what action he should take in an emergency of the described type. The auxiliary control system is directly responsive to abnormal depression of the regular brake pedal, such as occurs automatically when the regular hydraulic system fails.

A further aspect of the invention is the utilization of an electric motor with suitable relay control to provide the necessary force for mechanical application of the car brakes if the hydraulic system fails. That force is applied through an operating cable that is connected to the brakes, typically via the regular emergency or parking brake control system. A lost motion device is provided, so that the emergency system does not interfere with normal operation of the brake but can produce independent brake operation.

The invention further provides a convenient assembly of electric motor, reduction gearing, cable drum and other control devices, which assembly can be mounted as a unit in a variety of positions in an automobile, according to the preference of the operator.

Another aspect of the invention provides reliable means for insuring that the auxiliary brake action will continue until the automobile is safely brought to a stop. That is typically accomplished by providing a mechanical device such as a ratchet for holding the brake on until the operator takes special action to release the brake.

A further aspect of the invention provides convenient and reliable power means for releasing the brake after emergency application, and for returning the auxiliary control system to initial condition ready for further use if necessary. That may be accomplished by providing a a supplementary electric motor for reversing the brake drive.

A full understanding of the invention and of its further objects and advantages will be had from the following description of certain illustrative manners in which it can be carried out. The particulars of that description and of the accompanying drawings which form a part of it are intended only as illustration and not as a limitation upon the scope of the invention, which is defined in the appended claims.

In the drawings:

FIG. 1 is a schematic plan representing in somewhat fragmentary manner an automobile chassis embodying the invention;

FIG. 2 is a plan at enlarged scale representing an actuating unit in accordance with one aspect of the invention, with cover removed;

FIG. 3 is a section on the line 3—3 of FIG. 2;

FIG. 4 is a schematic wiring diagram relating to FIG. 3;

FIG. 5 is a section corresponding generally to FIG. 3 and representing a modification;

FIG. 6 is a vertical longitiudinal section representing an automotible brake pedal and associated switch mechanism in accordance with the invention;

FIG. 7 is a schematic wiring diagram relating to FIG. 6;

FIG. 8 is a detail of FIG. 1 at enlarged scale; and

FIG. 9 is a schematic wiring diagram relating to FIG. 5.

Referring first especially to FIG. 1, the main automobile frame is represented schematically at 10, with engine 12, transmission 13, rear axle 14 and drive shaft 16, partly broken away for clarity of illustration. The regular brake pedal is indicated at 20, controlling the brakes 22 on the rear wheels 23 and brakes 24 on the front wheels 25 through a conventional hydraulic system not explicitly shown. In addition to the hydraulic brake control system, the automobile is conventionally provided with an essentially independent emergency or parking brake control system. That conventional system, as illustratively shown in FIG. 1, comprises the hand lever 26 and mechanical linkage mechanism indicated generally at 28 connecting lever 26 to the rear wheel brakes 22. That linkage mechanism comprises the linkage lever 30, freely pivoted at 31 on the frame cross-member 32, the dual cable assembly 35 of Y-form, extending between lever 30 and both brakes 22, and the cable 36 connecting lever 30 with hand lever 26. Cable 36 is typically connected to linkage lever 30 at a radius from pivot 31 several times that of cable assembly 35, providing an appreciable mechanical advantage. The regular automobile storage battery is indicated at 40, connected in conventional manner via the lines 41 and 42 to energize the engine starting motor 38 via the power relay 39. Other usual parts of the automobile will be understood without explicit illustration and description.

In accordance with the present invention, an emergency brake actuating unit is mounted in a convenient position on the chassis, preferably in the trunk of the car body. Such a unit is shown in FIG. 1 at 50, bolted to the floor 52 of the trunk close to the forward trunk wall 53. A brake operating cable 54 extends forward from unit 50, around the idler pulley 56, which may be mounted on a convenient member of the car frame, for example, or on the lower surface of the floor 57 as indicated in FIG. 6. The free end of cable 54 is connected to link lever 30 adjacent the regular emergency cable 36, already described. Preferred mechanism for connecting cables 36 and 54 to lever 30 will be described more fully with reference to FIG. 8. Brake actuating unit 50 comprises means for drawing cable 54 rapidly toward the unit in response to an electrical signal.

That signal is developed automatically whenever the driver attempts to apply the brakes and the regular hydraulic system fails. As shown schematically in FIG. 6, a switch 44 is mounted on the frame member 33 that supports the car dashboard 34. The switch is typically positioned slightly forward of the pivot axis 48 about which brake pedal 20 swings on its lever 49. Switch 44 may, for example, be of the type that is used conventionally in automobiles for operating the back-up lights. The switch has an operating lever 46, which is yieldingly urged by the spring 45 to one extreme of its angular range, at which the switch is open. Even a small lever movement from that illustrated position in a counterclockwise direction, as seen in FIG. 6, causes the switch to close. An abutment member 47 is adjustably mounted at the free end of switch lever 46, as by a bolt passing through the longitudinal slot indicated in member 47.

That adjustment and the switch mounting are so set that partial depression of pedal 20, as in normal brake operation, does not engage abutment 49; but that depression of pedal 20 all the way to the floor, as indicated in dotted lines at 20a, such as occurs on failure of the hydraulic brake system, causes brake lever 49 to engage abutment 47, closing switch 44. Switch 44 typically has one side grounded and the other connected via the line 43 in series with battery 40 and the winding of a power relay, indicated at 47 in FIGS. 1 and 7. That relay may be similar to starter relay 39. The switch of relay 47 is connected in series with the battery and via the line 51 with brake actuating unit 50. Thus line 51 delivers an electrical energizing signal to that unit in response to closure of pedal-actuated switch 44.

FIGS. 2 and 3 show illustrative structure for actuating unit 50, comprising a housing 60 in which is mounted an electric brake control motor 62. Motor 62 may be of any suitable type, such, for example, as a conventional engine starting motor similar to motor 38. Brake control motor 62 is mounted on a suitable bracket structure 63, as by metal bands 64. The motor shaft 65 carries the pinion 66 and the ratchet wheel 68, which may be axially spaced by suitable collars and rotatively fixed to the shaft in any desired manner, as by setscrews or welding, for example. A second shaft 70 is journaled parallel to motor shaft 65 and spaced from it. Shaft 70 carries the gear wheel 72, which engages and is driven by pinion 66, and the cable drum 74, which is rotatively fixed with relation to gear 72.

Cable 54 passes through a suitable aperture 75 in the unit housing and is wound on drum 74, which acts as a reel for tensioning the cable. Ratchet wheel 68 is engaged by a ratchet lever 80, pivotally mounted on a pivot boss that extends from the housing wall. The spring 82 yieldably urges the ratchet lever into engagement with the teeth of the ratchet wheel, normally preventing rotation of drum 74 in a direction to unwind cable 54. The ratchet is selectively releasable in any desired manner, as by downward manual pressure on the handle 83 which projects through an aperture in housing 60 and is accessible on opening of the automobile trunk.

When power is supplied to motor 62, drum 74 is driven in a direction to wind in cable 54, causing lever 30 to swing about its pivot and apply the brakes 22. Ratchet lever 80 positively prevents release of the brakes, even after power has been deleted from the motor, insuring that the automobile will come to a complete stop. Once the car has safely stopped, if the operator desires to release the brake he can do so by opening the trunk and depressing handle 83 to release ratchet 80, relieving the tension in cable 54. To insure complete release of the brakes it is sometimes desirable to positively pay out cable from the drum. For that purpose either motor shaft 65 or drum shaft 70 may extend through the housing wall and carry a knob that is rotatable manually after release of the ratchet. In the present control unit, such paying out of cable is accomplished by energizing the supplementary reversing motor 86. As shown, that motor is mounted in an extension of housing 60 with its shaft typically directly coupled to that of brake control motor 62, as by the conventional coupling structure indicated at 88. Electric current is supplied to reversing motor 86 under control of the manual switch 90, which is connected in series with that motor and battery 40. The switch may be mounted in any convenient position, for example within the trunk above one of the wheels. It is shown illustratively mounted on the top wall of unit housing 60, where it is conveniently accessible to the operator while he is depressing ratchet handle 83.

As an alternative or supplementary means for controlling ratchet 80 or its equivalent, a solenoid 92 may be mounted in housing 60 with its armature 93 linked to ratchet handle 83, as indicated in FIG. 3, so that energization of the solenoid disengages the ratchet. The solenoid is then typically controlled by a manual switch 94 which may be mounted on the dashboard of the car or in some other conveniently accessible position. Wiring may be provided so that the same switch 94 will energize solenoid 92 and reversing motor 86 in parallel, as shown schematically in FIG. 4. With that illustrative arrangement, solenoid 92 and switch 94 may replace handle 83 and switch 90 of FIGS. 2 and 3. Alternatively, that handle and switch may be retained, switch 90 being connected in parallel with 94, as shown in dashed lines in FIG. 4. Reversing motor 86 can then be operated either remotely by switch 94 or directly at the control unit by switch 90.

A further illustrative control unit structure in accordance with the invention is represented at 50a in FIG. 5, wherein the reversible motor 62a performs the functions of both motors 62 and 86 of the unit of FIGS. 2 and 3. In FIG. 5, motor 62a is coupled to drum 74a on shaft 70a by means of the worm 95, fixed on the motor shaft, and the worm wheel 96, rotatively fixed with respect to the drum. The worm coupling takes the place of the ratchet of the previous mechanism, since when motor 62a is stopped drum 74a is effectively locked in position by action of the worm. Switch 44, which is operated by brake pedal 20 whenever the regular hydraulic system fails, is connected in such a way as to drive motor 62a forward to apply the brake. In addition, a manually controlled two-way switch may be mounted in any desired position, preferably within convenient reach of the driver, and so wired as to drive motor 62a selectively either forwardly to apply the brakes or rearwardly to release the brakes. That arrangement has the advantage that the emergency system may be tested at any desired time by manual application of the brakes; and after either test or emergency use of the system the brakes may be released relatively quickly and conveniently and the system returned to its normal stand-by condition. Moreover the manual switch may be employed if desired for applying the brake for parking or for other purposes.

FIG. 9 shows in schematic form an illustrative circuit arrangement for obtaining the motor control just described. The double-pole, double-throw switch and relay combination 100 has a handle 102 coupled mechanically to the two switch armatures 105 and 106, which are connected to the respective terminals of motor 62a by the lines 103. The switches are connected to battery 40 in a manner to supply positive voltage to the one terminal of the motor to apply the brakes when handle 102 is depressed, and to the other motor terminal to release the brake when the switch handle is raised from its normal neutral position. The relay winding 104 is connected in series between ground, switch 44 and battery 40. Closure of switch 44, as when the brake pedal is depressed to the floor due to failure of the hydraulic brake system, energizes relay 100, closing both switch armatures in the polarity to cause motor 62a to apply the brakes. After the car has stopped the brakes can be released manually by raising handle 102.

It may be desirable to protect the motor or motors in control unit 50 or 50a from being caused to stall after full application of the brake and from driving the cable drum too far in the direction of paying out cable 54. That can be done, for example, by providing a friction slip device at a convenient point of the drive train between the motor and cable drum 74. Then, if the drum is positively prevented from turning, the motor can continue to run. Such a friction device is indicated schematically at 106 in FIG. 5 and may be of conventional type. It is designed or adjusted to transmit ample torque without slipping to produce the desired degree of application of the brakes. The correct amount of slack in cable 54 during normal standby condition of the system can be produced conveniently by providing a positive stop for the drum. Such a stop is indicated illustratively in FIG. 5, comprising the pin 107 which projects axially from one face of the drum and engages the rigid abutment 108 mounted on the housing. Either the pin or the abutment can be made adjustable for convenience in installing and adjusting the equipment.

As shown best in FIG. 8, cables 36 and 54 are typically connected to lever 30 by means of lost motion devices which comprise the slotted box structures 55. The cable is connected at one end of the box and a spring 58 is connected between the other end and a fixed point of the car frame. Two headed pins 59 are fixed in lever 30 and work in the respective slots 59a. When either cable 36 or 54 is pulled against the force of its spring 58 to swing lever 30 about its pivot, the other cable is held taut by its spring while its pin 59 slides freely in slot 59a. Hence the brakes may be applied by tension on one of the cables without disturbing the other cable.

The particular examples of the invention that have been described may be modified in many respects without departing from the proper scope of the invention, which scope is defined in the appended claim.

I claim:

A safety brake control system for an automobile and the like having brakes on at least the rear wheels, an electrical battery, a hydraulic brake control system, a foot pedal normally depressible to actuate the hydraulic system to apply the brakes, a mechanical brake control system comprising cable means connected to the brakes and a handle actuable manually to tension the cable means to apply the brakes, and a trunk compartment, said safety brake control system comprising the combination of a housing mounted in the trunk compartment of the automobile, a main electric motor mounted in the housing and having a motor shaft, a cable reel rotatably mounted in the housing and coupled to the motor shaft to be driven thereby in a forward cable winding direction, a cable wound on the reel with one end extending through an aperture in the housing and coupled to said cable means to apply the brakes in response to forward cable winding rotation of the reel, lost motion means incorporated in said coupling of the cable to the cable means and in said connection of the manual handle to the cable means to permit brake operation independently by said handle and said cable, a ratchet means mounted in the housing and coupled to the motor shaft to normally prevent rearward motor rotation, a handle operatively coupled to the ratchet means and accessible outside said housing for manually releasing the motor shaft for rearward rotation, a solenoid mounted in the housing and coupled to the ratchet means to release the same in response to solenoid energization, an auxiliary electric motor mounted in the housing and coupled through a friction slip clutch to the shaft of the main motor to drive the same rearwardly when the ratchet means are released, circuit means including a switch actuable automatically in response to abnormal depression of said foot pedal to supply electrical energy from the battery to the main motor to drive the same forwardly to wind the cable and apply the brakes, and circuit means including a switch manually operable to simultaneously energize the solenoid and supply electrical energy from the battery to the auxiliary motor to drive the main motor shaft rearwardly and release the brakes.

References Cited

UNITED STATES PATENTS

| | | | |
|---|---|---|---|
| 1,396,426 | 11/1921 | Hartford | 188—162 |
| 2,834,438 | 5/1958 | Riddle et al. | 188—106 X |
| 2,835,353 | 5/1958 | Brundage | 188—162 X |
| 2,933,159 | 4/1960 | Stiebinger | 188—106 |
| 3,017,965 | 1/1962 | Hill | 188—106 X |

FOREIGN PATENTS 416,750  9/1934  Great Britain.

DUANE A. REGER, *Primary Examiner.*